United States Patent [19]

Hoover

[11] Patent Number: 5,078,094
[45] Date of Patent: Jan. 7, 1992

[54] ELEVATOR TOY FOR SMALL ANIMALS

[76] Inventor: Judith L. Hoover, 3108 Killian Rd., Uniontown, Ohio 44685

[21] Appl. No.: 593,075

[22] Filed: Oct. 5, 1990

Related U.S. Application Data

[62] Division of Ser. No. 460,992, Jan. 4, 1990, abandoned.

[51] Int. Cl.$^5$ .................................................. A01K 15/00
[52] U.S. Cl. ........................................ 119/15; 119/174
[58] Field of Search ........................... 119/29, 174, 15; 273/115, 153 R; 272/6; 446/476, 477, 479, 423

[56] References Cited

U.S. PATENT DOCUMENTS

| | | | |
|---|---|---|---|
| 802,199 | 10/1905 | Corley | 272/6 |
| 1,027,229 | 5/1912 | Yetter | 187/5 |
| 1,031,383 | 7/1912 | Sheehan et al. | 187/5 |
| 1,127,462 | 2/1915 | Lightheart | 187/5 |
| 1,231,075 | 6/1917 | Seegerger | 272/6 |
| 1,751,644 | 3/1930 | McKenzie | 187/5 |
| 2,908,498 | 10/1959 | Becrafa | 272/6 |
| 3,785,651 | 1/1974 | Smith | 273/153 R |
| 3,789,538 | 2/1979 | Spengler et al. | 446/423 |
| 3,949,930 | 11/1974 | Stubbmin | 446/476 |
| 4,027,626 | 6/1977 | DeSousa | 119/15 |
| 4,109,410 | 8/1978 | Saito | 446/423 |
| 4,359,837 | 11/1982 | Hool | 446/171 |
| 4,824,098 | 4/1989 | Huang | 273/113 |

*Primary Examiner*—Paul J. Hirsch

[57] ABSTRACT

An elevator toy for small animals (hamsters, gerbils, mice, or other small animals) in transparent plastic and comprising an animal-operated and automatically resetting elevator embodied in a counterbalanced and reciprocating double-car assembly wherein downward transport in one car automatically resets the other car and eliminates shearing action during animal exit. The cars are connected by ball chain suspended over guide pulleys in a containment structure with two additional means of control. First, there is an animal released or weight-sensitive retaining means to hold the car in position, preferably a non-toxic ceramic ring magnet, which comes into contact with a metallic component on the top of the car. Second, there is a cushioning means, preferably a compression spring, with the ring magnet attached in concentric fashion to the lower end of the spring, and the spring itself attached to the underside of a pulley guard housing on the lid of the containment structure. The ball chain connecting the counterbalanced elevator cars passes upward through the center of each magnet and spring and then through a tiny hole in the guard housing and over the guide pulleys, so that all forces are centered on each car. The containment structure allows food to be dropped into each elevator car to motivate the animals, and also employs one-way passage means to encourage proper use of the toy and increase its complexity and entertainment value. The elevator cars are removed from their shafts with the removal of the containment structure lid for easy access and cleaning, which may also allow removal of an auxiliary staircase, further comprising a plurality of stations connected by apertures in an alternating or rotational sequence which is vertically offset in an incremental and progressive manner. There are numerous safety features. A bell is optional, and the toy may be used in combination with a cage, tube, ladder, or particularly, a spiral staircase.

25 Claims, 4 Drawing Sheets

ELEVATOR TOY FOR SMALL ANIMALS

CROSS-REFERENCE TO RELATED APPLICATION

This application is a division and continuation-in-part of U.S. patent application No. 07/460,992, filed Jan. 4, 1990, now abandoned.

BACKGROUND OF THE INVENTION

This application is further related to U.S. patent application No. 07/682,881 a continuation-in-part of the former application filed Apr. 8, 1991.

1. Field of the Invention

This invention relates to a toy for small animals (hamsters, gerbils, mice or other small animals), and more particularly to an animal-operated and automatically resetting elevator in transparent plastic with one-way passage means to encourage the proper use of the elevator.

2. Description of the Prior Art

The observation of small animal behavior inevitably leads to the conclusion that there is considerable potential for entertainment, limited only by the pet toys available, for these animals are game for almost anything they can learn or "fall into." Patience is essential with complex toys, but the payoff is bigger.

What led to the conception of the elevator was a desire to provide the small animal with a toy that does something to him when he isn't doing anything to it—an unexpected but stimulating, enjoyable, and ultimately controllable movement. Not just exercise, but entertainment—like having a car instead of a bicycle.

In U.S. Pat. No. 4,291,488, Orenstein's elevator is operated by a toy "animal" moving a lever and releasing the elevator car; however, the elevator must be reset manually.

Several other patented toy elevators operate on means other than passenger control and gravity. In Hool U.S. Pat. No. 4,359,837, an external operator is required to raise the elevator using a cord. In Stubbman U.S. Pat. No. 3,849,930, the elevator is fully dependent upon manual manipulation. A more sophisticated elevator is disclosed in Saito U.S. Pat. No. 4,109,410, showing a manually switched-on battery-operated fan for lifting the elevator on a column of air. Spengler U.S. Pat. No. 3,789,538 discloses an elevator with endless drive means and a bi-directional hand crank. In Einfalt U.S. Pat. No. 3,593,454, the elevator is externally operated using a crank lever with a clockwork or motor-driven coiled spring. None of the above could be operated solely by an animal and automatically reset. DeSousa, in U.S. Pat. No. 4,027,626, discloses an elevator which is both animal-operated and animal reset. A counterbalance retains a compartment in a raised position, whereupon the entry of a small animal overcomes the weight of the counterbalance and causes the car to descend. When the animal exits, the car returns to the raised position. In practice, this device presents some problems, particularly the safety of the animal. Since the counterbalance acts as a retaining means to hold the car in a raised position, there is no means for releasing tension in the system. The weight of the animal merely overcomes the weight of the counterbalance, and therefore, when the animal exits the car, shearing action is produced which could harm the animal and possibly catch his tail. If the counterbalance is so light that shearing action is not a problem, then the small animal would descend too quickly to please the animal or entertain the viewer as he should, the event being very short-lived. The present invention overcomes these problems with a pair of counterbalanced cars and additional control means to optimize the comfort of the small animal and the entertainment of the viewer.

Counterbalanced elevators and dumbwaiters are well known, e.g., Seeberger U.S. Pat. No. 1,231,075. However, the counterbalance itself is usually a compact weight and not a second compartment. Moreover, the sophisticated controls do not lend themselves to animal operation.

In U.S. Pat. No. 2,908,498, Becraft employs a counterbalanced double-seated device as a child's playroom ride, but the operation of the ride is largely non-analogous to the present invention. The playroom ride is intended for use by two passengers rather than one, both simultaneously and continuously. Normally, the elevator is used by one small animal which enters, is transported, and then exits. In the playroom ride, not only does gravity act on the passengers' weight, but each passenger must exert leg pressure to complete a cycle. In contrast, one animal operates the elevator, with gravity alone acting on its weight, and this same force resets the elevator. In addition, the playroom ride is probably entered and exited simultaneously with each seat in mid-position, so an automatic half-cycle reset whereby an empty elevator car is located in the "up" or ready position when an animal has completed his elevator transport is a different problem involving a different principle of operation. Finally, the shearing action upon leaving the child's ride is managed by the passengers rather than being inherently solved by the automatic resetting of the invention in a fixed position.

It is submitted that the application of an elevator for use in a toy for small animals promises to be more entertaining to a young or not-so-young person than something which must be manipulated by hand because of the displacement of control onto the animal and the unpredictable behavior of the animal.

Moreover, the toy is designed to operate safely, and the mechanical parts involved, i.e. ball chain, springs, magnets, and pulleys are minimal in number and may be standard parts, which serves to keep the cost down.

Figure 1:
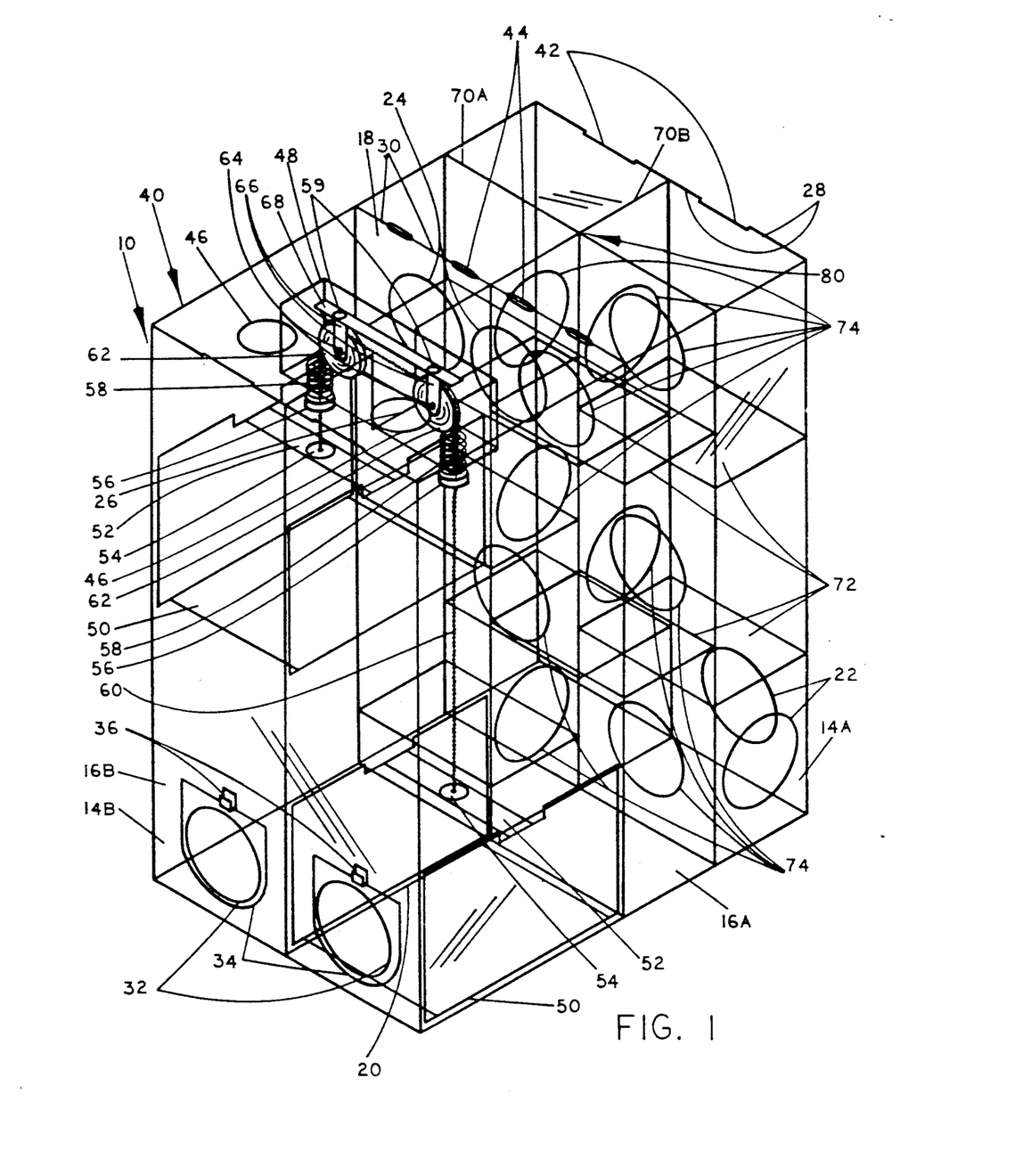
FIG. 1 is an isometric view of the elevator toy in combination with the staircase toy previously mentioned as actually viewed in transparent material. This figure conveys the puzzle-like quality of the toy, with internal elements clarified in subsequent views.
Figure 4:
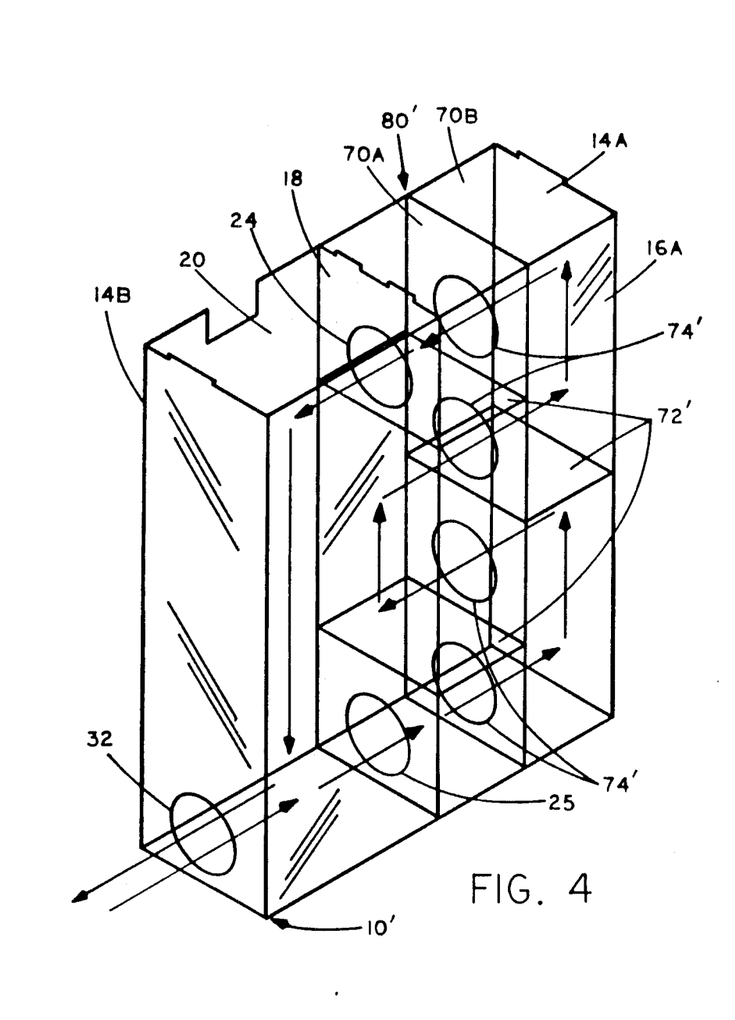
FIG. 4 is an isometric view of a longitudinal half-section of a symmetric elevator/staircase combination toy with the elevator assembly and lid removed. This fourth alternate embodiment shows another way of controlling access to the elevator cars when used with elevator cars possessing front walls (see dotted lines in FIG. 2) which block the lower staircase entrance apertures but come to rest below the upper elevator entrance apertures. Arrows show the animal's path.

A tube, ladder, or other compatible device may be used to get the animal to the top of the elevator, although a more novel approach uses a related invention which is disclosed in U.S. patent application No. 07/682,881, filed Apr. 8, 1991. This staircase toy provides both an interesting approach to the elevator in the form of a spiral, switchback, or other regular arrangement of living compartments connected by apertures at incremental elevations. More particularly, as shown in FIGS. 1 and 4, the living compartments or stations are large enough to comfortably support a small animal and are arranged in an alternating or rotational sequence, with apertures connecting each one to the next in turn, and with the sequence also arranged in staircase-like fashion, being offset horizontally and offset vertically in incremental and progressive steps, the increments generally being less than the height of a station, and progressive being successively higher. The entire structure is easily disassembled for cleaning.

Cover flaps on some of the apertures of the elevator add yet another form of amusement and challenge. They also serve to guide the animal through an aperture in the preferred direction. Doors which allow larger pets to enter and leave an owner's home are well known.

Currently-known toys for small animals include the exercise wheel and interconnecting plastic tubes. While the wheel provides the animal with much-needed exercise, it offers little entertainment to the human observer. The tubes can become expensive quickly, take up considerable space, and may accidentally disconnect. The present invention provides a new experience for the animal and more entertainment for the human observer.

The inventor holds a firm belief that some cages are too small for even one animal, and that any toy learned in 30 seconds isn't enough of a challenge to the animal. It is hoped that the availability of a quality toy will result in the purchase of a larger cage, or even in the decision to purchase a pet in the first place.

SUMMARY OF THE INVENTION

The present invention, generally stated, provides a toy for small animals which gives the animal the opportunity to operate an elevator in a safe and comfortable manner, and optionally navigate a staircase-type access means and a gate, cover flap, or one-way passagemeans, and to open a cover flap on an aperture, and repeat the procedure a limitless number of times at his own discretion, each time resetting the toy himself for the next ride.

Accordingly, the primary object of this invention is to provide a toy for small animals that is both challenging and amusing to the small animal and entertaining for the human observer.

It is also an object of this invention to provide a toy which may invite human interaction to motivate the animal by placing treats in strategic locations.

It is also an object of this invention to provide a toy for small animals which is safe for the animal regardless of how the animal uses it and which requires only common sense on the part of the human observer to ensure that the toy is set up without any obstruction to the elevators and exits.

It is also an object of this invention to provide a toy for small animals which is capable of being disassembled to facilitate cleaning.

It is also an object of this invention to provide a toy for small animals which may be used alone or modified to become a cage extension.

It is also an object of this invention to provide a toy for small animals which may be economically manufactured with a minimum of parts.

It is also an object of this invention to provide a toy for small animals which possesses enduring popularity and a classic design.

These and other objects, features, and advantages of the invention will become apparent from examining the drawings and description hereinafter given.

The preferred embodiment and a number of alternate embodiments are delineated. The novel features that are considered to be characteristic of the invention are set forth with particularity in the appended claims.

DETAILED DESCRIPTION OF THE INVENTION

Referring now to the drawings, FIG. 1 illustrates the elevator toy combined with a staircase toy for small animals in a common containment structure. The containment structure 10 is essentially a rectangular box which is multi-compartmented and open at the top. It is preferably molded from transparent plastic or fabricated from transparent sheet plastic. Alternate embodiments may vary in geometric shape, size, and the choice and number of sides (including top and bottom) left open.

In the preferred embodiment, there are entrance apertures 22 in side wall 16A and in end wall 14A which provide access to the bottom of the staircase compartment adjacent to end wall 14A. Access from two sides of the containment structure 10 allows flexibility in placement of the toy in a cage.

Additionally, there is an internal dividing wall 18 in containment structure 10 between the staircase compartment adjacent to end wall 14A and elevator compartment adjacent to end wall 14B. This dividing wall has apertures 24 which allow passage from the staircase side to the elevator side of the toy. The elevator compartment is further divided into two equal shafts by wall 20 between dividing wall 18 and end wall 14B. This wall 20 is a safety feature which prevents the animal from being exposed to the shearing action which occurs during the operation of the elevator, should the animal not be entirely within an elevator car 50. Also, dividing wall 20 helps guide and control the cars. A notch 26 at the top of dividing wall 20 is only as large as necessary to receive the pulley housing 48 attached to the removable lid 40. These dividing walls 18 and 20 are shown fixed but may be removable. Dividing wall 20 could also extend the full length of the containment structure and interlock with a slotted dividing wall 18 and another slotted wall to form a staircase like the one shown.

The upper surfaces of end walls 14A and 14B and dividing wall 18 of containment structure 10 have notches 28 and 30, which serve to secure the removable lid 40 with notches 42 corresponding to notches 28 and slots 44 corresponding to notches 30. This arrangement is quite adequate for a toy placed in a cage; however, when the toy is to be used as a cage extension, a more secure arrangement would be indicated, such as an overlapping snap fit. The popular bottom tray could also be incorporated into the design.

There are two exit apertures 32 in end wall 14B of containment structure 10. Each aperture 32 possesses a cover flap 34 attached by a hook-like fastener 36 above each aperture 32. The attachment 36 allows each flap 34 to open easily when pushed from the inside of containment structure 10, as a small animal will instinctively learn to do after descending in an elevator car 50. The contour of each flap 34 is preferably round for safety reasons, and the edges are smooth to discourage a reverse entry, although entertainment is the goal of the toy and not good behavior. Perverse critters that are able to defeat the cover flaps 34 will use the toy often enough in the correct manner also.

The lid 40 possesses two apertures 46, one over each elevator car 50, preferably near the exit ends of the cars. These apertures 46 are too small for animal passage, but large enough for the dual purpose of grasping the lid and dropping treats into the elevator cars 50. The lid 40 also serves as an ideal location for affixing the elevator assembly.

When used as a cage extension, the elevator would connect with well-known tubes or be adapted to placement on top of a cage, possibly with a bottom entrance into the combined staircase assembly, and possibly with extra compartments leading out of the elevators and joining together for a common connection point. A way of requiring only one external connection would be to have the elevator exits leading back into the staircase structure through the dividing wall 18 instead of out the end wall. Then the toy would connect at only one external staircase entrance. In order to connect with tubes, the apertures would be round with notches, and a version of the well-known connecting ring would fit inside the aperture and over a connecting tube, twisting to be secured. Another type of connection device would have a pushbutton lock-fitting into a perfectly round aperture of the toy.

Staying with FIG. 1, the preferred embodiment of the elevator portion of the toy employs two counterbalanced elevator cars 50, in an approximate state of equilibrium, also made of transparent plastic, but possibly having opaque floors to eliminate confusion and assure the animal. The reciprocating design wherein the cars exist alternately and oppositely in ready and non-ready positions upon animal transport accomplishes (a) safe operation—the cars 50 remain stationary as the weight of the animal is removed upon exiting, thus preventing injury to the animal's tail or legs, and (b) automatic resetting of the cars 50 in one-half cycle—one car 50 is always in the "up" or ready position.

In the preferred embodiment of FIG. 1, the elevator cars 50 themselves have additional safety features: the floors are slightly shorter than the sides to prevent the pinching of tails and legs. In addition, the downward transport in a car 50 would release rather than catch any body parts. The open-top crossbars 52 of the cars prevent the animal from getting trapped. In the event the animal chooses to jump into a car 50 in the "down" or nonready position, he can complete the route through the toy. The height of the elevator shaft should not be such that it poses a danger to the animal. If the animal were in a car 50 which had foreign material stopping it part way down, he would usually be able to reach the upper entrance 24 and leave. Otherwise he would merely be confined in an area which should not be uncomfortably small, and he would not be harmed. In practice, even the use of bedding inside the elevator cars 50 has not caused this problem. However, a responsible pet owner should regularly check his pet under any circumstances.

The outer dimensions of the elevator cars 50 are just slightly less than the corresponding width and length of the elevator shafts. This close match stabilizes the movement of the cars 50 and minimizes friction.

The elevator cars 50 are attached to the ends of a cable 60 so that they hang freely in their respective elevator shafts. The cable 60 travels over two pulleys 62 affixed by posts 64 to supports 66 which are in turn attached to a bar 68 which has rivets 59 anchoring the entire assembly to the lid, so that lid and elevator cars are cooperatively and simultaneously removable.

The ideal choice of cable is stainless steel ball chain, since it is inexpensive, comes in several dimensions and finishes, and is chew-proof. If the commonly available diameter and finish of the chain 60 are properly matched to the groove diameter and friction characteristics of the pulleys 62, the rate of descent will require no more sophisticated means of control and will work well for a range of sizes of small animals. The pulleys 62 themselves may be fixed or free to rotate. Different sizes of ball chain could be interchangeable, if necessary, being detached from end clasps or sleeves (refer to FIG. 5) and slipped through holes in the crossbars 52 of the elevator cars 50.

Figure 2:
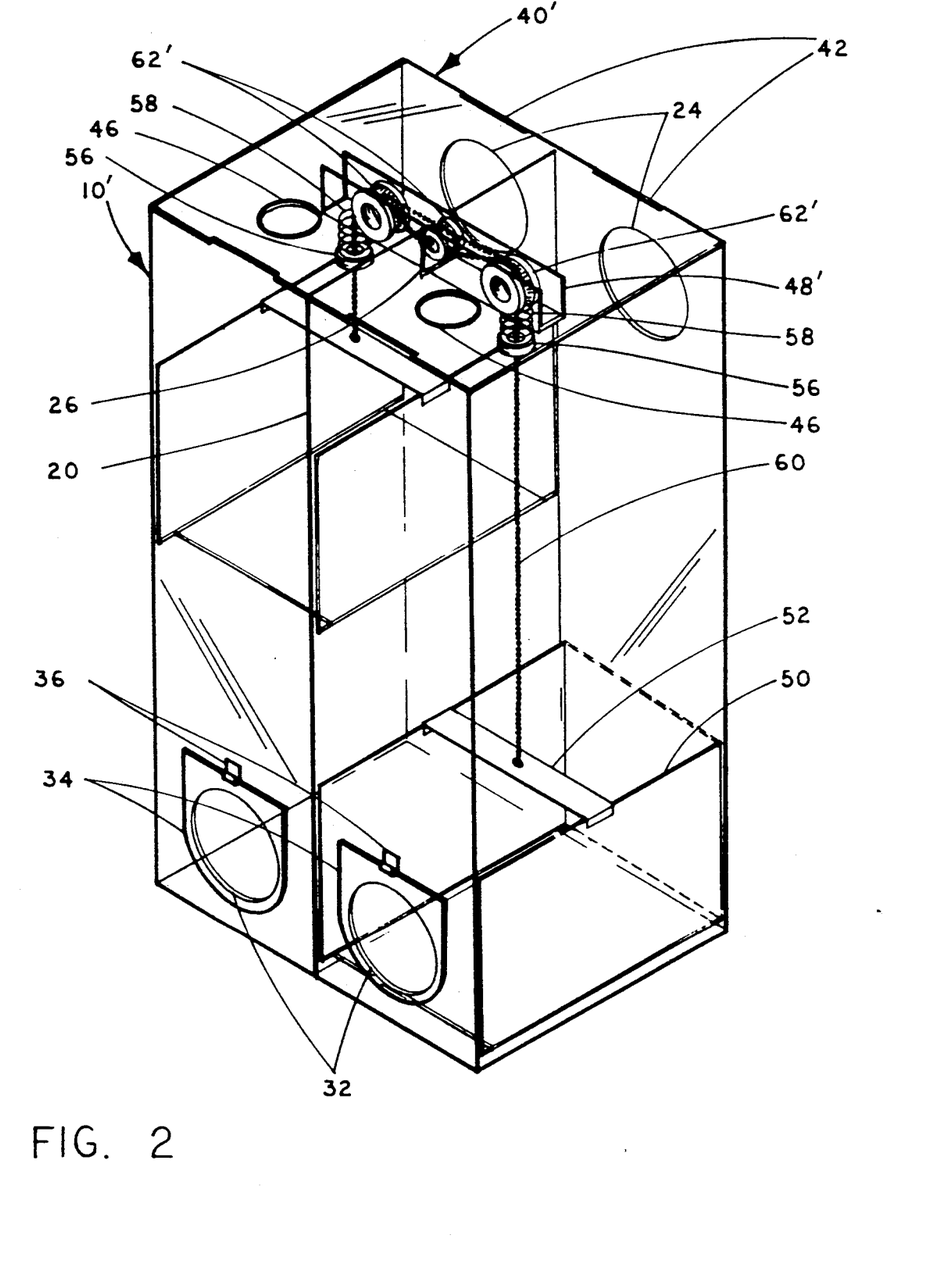
FIG. 2 is an isometric view of the elevator toy alone with cars suspended from an alternate cable guide, a fixed dummy pulley assembly, enclosed in a guard housing attached to the lid of the containment structure. Ball chain is shown routed through the dummy pulleys in two ways for adjusting the rate of descent.

Alternately, as shown in FIG. 2, more variable speed control could be derived from the use of three fixed "dummy" pulleys or curved surfaces (which do not rotate and require no hardware) with the cable routed variably as shown according to the weight of the animal and the amount of friction needed to slow its descent. For heavier animals, the cable would be routed over the outer "pulleys" and beneath the center one, and for lighter animals, the cable would be routed over all three "pulleys". These elements could be machined parts or integrally molded plastic. More complex parts including a sprocket wheel and speed control should not be necessary for the commonest sizes of hamsters, gerbils, and mice found in pet shops. Smaller animals will move more slowly, and larger animals will move more quickly; movement should not be violent.

It should be noted in connection with the descent of the elevator cars, that when two or more animals are using the toy simultaneously, one may be able to enter an elevator exit and be subject to his cagemate riding down on him in an elevator car. Small animals can do wondrous things and are known for squeezing into tight places. Unlike shearing action, with healthy adults this should be of no concern in a proper design. However, very young animals should not be mixed with very large animals, and that message should be conveyed to the user.

The pulleys 62 in FIG. 1 are enclosed in guard housing 48 with open side away from apertures 24. The pulleys 62' in FIG. 2 are enclosed in guard housing 48' with open ends and attached to lid 40' of containment structure 10'. The underside of each housing possesses holes large enough for the cable 60 to pass through. Simultaneously, this is a convenient location for attachment of (a) a cushioning means, namely the compression springs and (b) part of an animal-released retaining means, namely nontoxic or coated ceramic ring magnets 56. The magnets 56 come into contact with corresponding metallic components 54, either washers or magnets on the crossbars 52 as shown in FIG. 1, or the entire crossbar 52 could be metallic as shown in FIG. 2 to discourage the chewing of a critical element. This preferred retaining means is responsive to the weight of the small animal. In some embodiments the magnetic holding force might be adjusted by removing the lower metallic component 54 entirely for a very small animal, by adding plastic or paper spacers, or by laterally moving a split component equivalent to component 54 away from the cable so that less surface contact is made.

It is important to note that both the retaining action and the cushioning action of the elevator assembly are critical features, affecting the acceptance and enjoyment of the toy by the animal.

As shown in FIG. 1, the cable 60 travels around the pulleys 62, passes through holes in the guard housing 48, down through the compression springs 58, and finally through the ring magnets 56, dropping vertically to attach at the midpoint of crossbars 52 of each elevator car 50, around which points exist metallic components 54. This arrangement produces perfect centering of all the forces acting on the elevator car 50.

Alternate embodiments include (a) the use of a simpler grooved surface to guide the cable instead of pulleys 62 or 62', (b) the use of a flat or leaf spring in place of compression springs 58 or simply flexible material used as crossbars 52 of cars 50 or elsewhere to cushion the stopping action of the cars 50, and (c) a mechanical lever catch or merely flexible tabs rather than magnetic retainers 56 and components 54 for retaining the cars 50 in both ready and non-ready fixed positions.

Figures 5, 6:
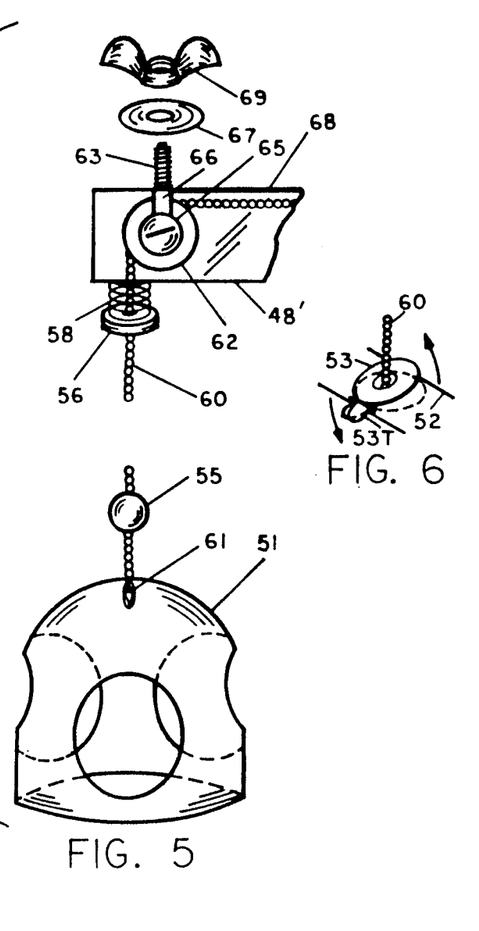
FIG. 5 shows one side of a symmetric fifth alternate embodiment for the elevator which eliminates the containment structure and includes means for attaching the elevator assembly to the top of a wire cage or vented plastic cage lid.
FIG. 6 shows an alternate retaining means or the elevator cars which requires the small animal to deliberately operate a lever or tab on a tab-disk structure which pries apart magnetically-attracted components.

Additionally, the animal could be required to operate a lever to release the elevator car (FIG. 6). This lever could be a tab 53T extending from a thin plastic disk 53 which normally rests on the lower magnetic component 54 and separates the upper and lower magnetic components 56 and 54 just slightly. This tab-disk structure would be movably anchored to the crossbar 52 of the elevator car. Magnetic attraction would be sufficient to hold the elevator car 50 up until the animal moved the tab and exerted a prying force between the magnetic components 56 and 54 to release them. This arrangement is workable, but the elevator is already animal operated without it, his weight performing the work, and the act of entering an elevator car will change from being accidental behavior to deliberate behavior on the part of the animal.

Tracing the path of a small animal through the preferred embodiment of the combination toy, he enters the bottom of the staircase compartment structure through one of two apertures, and proceeds in a clockwise fashion alternately through an aperture and onto a step, until he reaches the elevator level. Ideally, he chooses to pass through the aperture in the dividing wall into the "up" elevator car or perhaps he sees the food his owner dropped into this car and approaches it. As he tentatively places his front paws into the car, the holding action of the magnets provides him with firm footing until he commits four feet and all of his weight to the entry. This releases the car and the animal rides gently down, very slowly for a small animal, and slightly faster for a larger animal, to the bottom of the shaft. Just before the car reaches bottom, the reciprocating car moving upward makes magnetic contact and engages the compression spring. This provides the animal with a soft landing and fixes the cars in their respective positions, so that, now, having had one brand new experience, the animal is immediately faced with another one: how to negotiate a cover flap. After a successful exit, the entire process may be immediately repeated, or some feature of the toy will become very popular. With seven animals, learning time has ranged from about 10 minutes for mice to an unusual 10 hours for a pet shop gerbil with no toy experience, but with an immediate, perfect repetition in the 10-hour case.

Figure 3:
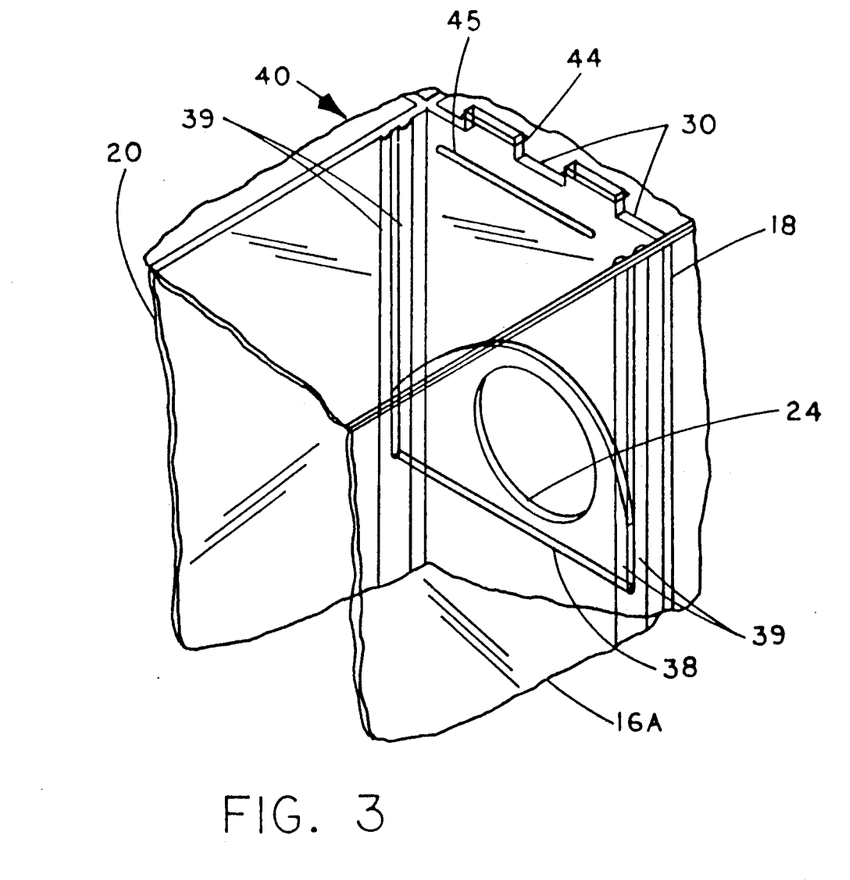
FIG. 3 is a removed section of the combination toy as shown in FIG. 1, with the addition of an elevator-controlled gate on the aperture leading from the staircase structure to the elevator. This second alternate embodiment would possess such a gate on each of two elevator entrance apertures.

FIG. 3 shows an alternate embodiment not recommended and not really necessary, with gating of the apertures 24 on dividing wall 18, so that a car 50 in the "up" position would lift up a lightweight sliding gate 38 movably attached to the containment structure by traveling up and down between guide grooves 39 in dividing wall 20 and side walls 16A and 16B, with an escape slot 45 through the lid. The gate would remain open only as long as a car were available, and would necessarily leave a gap even when closed to prevent pinching toes and clipping tails. Any type of gate is not recommended, however, because a gerbil's tail is a very delicate body structure and even friction could do damage. Any automatic action must also be safe for two animals using the toy simultaneously. Closure of any type—horizontal over the elevator car or vertical at the aperture, sliding, swinging, rotating, revolving, or always closed but only unlatched by a car in the upper position—is strongly not recommended here (1) because it is not really necessary for the success of the toy, (2) because there is a strong tendency for the animal to try to go where he can't, and the gate can be counterproductive, (3) for safety reasons if it does not work perfectly, and 4) because other embodiments could limit access to only the upper car if this is considered an issue of importance. In the simpler design of the preferred embodiment, the animal will use the elevator properly enough of the time, and jumping down to the lower car is just another amusing activity. Nevertheless another embodiment limiting elevator access follows.

Referring now to FIG. 4, another embodiment of the elevator used in combination with a staircase which has completely separate sides shows a different method of restricting access to only the "up" or ready elevator car. This arrangement is used in conjunction with elevator cars which have closed ends facing wall 18. The entrances 25 to the staircase compartment structure are internal on wall 18 and replace external entrances 22. The staircase compartment structure is divided by vertical wall 70B which lacks any apertures 74. Vertical surface 70A possesses four apertures 74' and three horizontal surfaces 72' on each side of 70B, arranged so that, on each separate side of the staircase compartment structure, the animal must travel in a switchback or zigzag path to the top of the staircase compartment structure. Thus, the "down" or non-ready elevator car blocks the access means or very route which leads to its own upper entrance, and the "up" elevator car allows passage to its upper entrance. The "up" elevator comes to rest at a low enough position so that its end wall does not block aperture 24. Apertures 32 are shown without cover flaps 34 so that the animal may enter easily and proceed to aperture 25.

In another embodiment of this small animal toy shown in FIG. 5, the elevator assembly would be attached to the top of a wire cage or vented plastic lid by means of two bolts 63 projecting out of the cage and secured by washers 67 and wing nuts 69. The ends of the pulley guard housing 48' are open. No containment structure is used and the elevator cars 51 are accessible from any side and spaced a safe distance apart. An elevator car guide means may or may not be desirable, depending on the elevator car design. The upper and lower stopping points of the cars can be adjusted to match existing cage levels by a) clipping the detachable ball chain 60 and re-inserting it through a tiny hole in the car, adding any of the commonly available sleeves 61 for ball chain to determine the length of the chain and the lower stopping point, then by b) adding a combination metallic component/car stop 55 such as a hollow ball available from ball chain manufacturers to the ball chain above each car, which will not pass through the magnets 56 and which will determine the upper stopping point.

It might be desirable to add a bell to the elevator assembly, which would alert an owner that his pet is using the elevator. As shown in FIG. 5, small jingle bells 65 rotate on the posts 64 of pulleys 62. Bells could also be placed so that they are agitated by the cable 60 or irregular edge of a pulley 62. Or the rising elevator car 50 could strike a lever which in turn strikes a bell.

The entire toy is designed to be easily cleaned and maintained through convenient disassembly.

It is to be expressly understood that the present description and preferred embodiment are for illustrative purposes only and are not to be construed as a limitation of the details of construction or design of the invention, but rather are inclusive of other variations and applications which do not depart from the broad interest and intent of the invention. Accordingly, the scope of the invention should be determined by the appended claims.

What is claimed is:

1. A pet toy for small animals comprising:
   an elevator with at least one elevator car suitable for small animal occupation, connected to a cable suspension means,
   animal-controlled means for achieving elevator transport,
   animal-controlled means for resetting said elevator for subsequent use, and
   means for the prevention of shearing action during animal exit from said elevator car.

2. The pet toy defined in claim 1 wherein said elevator comprises a pair of counterbalanced elevator cars, connected by a cable suspended over a guide surface, in an approximate state of equilibrium, said elevator cars further existing in reciprocating relation, whereby they are alternately and oppositely located in ready and non-ready positions upon animal transport.

3. The pet toy defined in claim 2 further comprising:
   a containment structure,
   a plurality of stations therein, said stations suitable for comfortable small animal occupation, located at incremental and progressive levels, and arranged to allow passage therebetween,
   at least one access aperture between the stations and the elevator cars,
   one-way passage means for encouraging proper use of the elevator, and
   animal-released retaining means for holding the elevator cars fixed in both ready and nonready positions.

4. The pet toy defined in claim 2 further comprising variable speed control means for regulating the descent of said at least one elevator car, said variable speed control means selected from the group consisting of: a variably routed cable routed over a guide surface, interchangeable cables, and limitation means for the guide surface movement.

5. The pet toy defined in claim 1 further comprising animal-released retaining means for holding said at least one elevator car fixed in both ready and non-ready positions.

6. The pet toy defined in claim 5 wherein said animal-released retaining means is responsive to animal behavior beyond the application of weight in said at least one elevator car.

7. The pet toy defined in claim 5 wherein said animal-released retaining means further comprises permanent magnetic means.

8. The pet toy defined in claim 5 further comprising cushioning means and wherein each of the forces related to said cable suspension means, said animal-released retaining means, and said cushioning means are separately and together centered on each said at least one elevator car, thereby eliminating any tendency for the elevator cars to tilt or become misaligned from said forces and thereby maximizing responsiveness, efficiency, and safety.

9. The pet toy defined in claim 2 further comprising:
   a containment structure,
   a plurality of stations therein, said stations suitable for comfortable small animal occupation, located at incremental and progressive levels, and arranged to allow passage therebetween, and
   at least one access aperture between the stations said at least one elevator car.

10. The pet toy defined in claim 9 further comprising variable speed control means for regulating the descent of said at least one elevator car selected from the group consisting of: a variably routed cable routed over a guide surface, interchangeable cables, and limitation means for the guide surface movement.

11. A pet toy for small animals comprising:
    an elevator with at least one elevator car suitable for small animal occupation, connected to a cable suspension means,
    animal-controlled means for achieving elevator transport,
    animal-controlled means for resetting said elevator for subsequent use, and
    animal-released retaining mean for holding said at least one elevator car fixed in both ready and non-ready positions.

12. The pet toy in claim 11 wherein said animal-released retaining means is responsive to animal behavior beyond the application of weight in said at least one elevator car.

13. The pet toy defined in claim 11 wherein said animal-released retaining means further comprises permanent magnetic means.

14. The pet toy defined in claim 11 further comprising variable speed control means for regulating the descent of said at least one elevator car selected from the group consisting of: a variably routed cable routed over a guide surface, interchangeable cables, and limitation means for the guide surface movement.

15. The pet toy defined in claim 11 further comprising:
- a containment structure,
- a plurality of stations therein, said stations suitable for comfortable small animal occupation, located at incremental and progressive levels, and arranged to allow passage therebetween, and
- at least one access aperture between the stations and said at least one elevator car.

16. A pet toy for small animals comprising:
- an elevator with at least one elevator car suitable for small animal occupation, connected to a cable suspension means,
- animal-controlled means for achieving elevator transport,
- animal-controlled means for resetting said elevator for subsequent use, and
- a containment structure with a removable lid, wherein said lid and said at least one elevator car are cooperatively and simultaneously removable from said containment structure.

17. A pet toy for small animals comprising:
- an elevator with at least one elevator car suitable for small animal occupation, connected to a cable suspension means.
- animal-controlled means for achieving elevator transport,
- animal-controlled means for resetting said elevator for subsequent use,
- a containment structure,
- a plurality of stations located therein, said stations large enough to comfortably support a small animal, arranged in staircase-like fashion, being both horizontally and vertically offset to allow passage therebetween, and
- at least one access aperture between the stations and said at least one elevator car.

18. The pet toy defined in claim 17 wherein the stations are connected by apertures in an alternating or rotational sequence, the stations thus connected also being offset vertically in an incremental and progressive manner, with increments generally being less than the height of a station, and progressive being successively higher.

19. The pet toy defined in claim 17 further comprising one-way passage means for encouraging proper use of the elevator and at least one aperture located over said at least one elevator car to allow convenient and motivational insertion of food.

20. The pet toy defined in claim 17 wherein a safe and complete route through the toy exists through said at least one elevator car in a non-ready position.

21. The pet toy defined in claim 17 wherein only said at least one elevator car in a ready position is accessible to a small animal.

22. The pet toy defined in claim 17 wherein said at least one elevator car in a non-ready position itself is a block to its use, without the use of an additional gate.

23. The pet toy defined in claim 17 further comprising variable speed control means for regulating the descent of said at least one elevator, said variable speed control means selected from the group consisting of: a variably routed cable routed over a guide surface, interchangeable cables, and limitation means for the guide surface movement.

24. The pet toy defined in claim 17 wherein said elevator further comprises a pair of counterbalanced elevator cars, connected by a cable suspended over a guide surface, in an approximate state of equilibrium, said elevator cars further existing in reciprocating relation, whereby they are alternately and oppositely located in ready and non-ready positions upon animal transport.

25. The pet toy defined in claim 24 further comprising an animal-released retaining means for holding said elevator cars fixed in both ready and non-ready positions, and means for the prevention of shearing action during animal exit from the elevator cars.

* * * * *

UNITED STATES PATENT AND TRADEMARK OFFICE
CERTIFICATE OF CORRECTION

PATENT NO. : 5,078,094

DATED : January 7, 1992

INVENTOR(S) : Judith L. Hoover

It is certified that error appears in the above-identified patent and that said Letters Patent is hereby corrected as shown below:

Column 10, line 4, (claim 4), change, "2" to --1--.

Column 10, line 31, (claim 9), change, "2" to --1--.

Signed and Sealed this

Thirtieth Day of March, 1993

Attest:

STEPHEN G. KUNIN

*Attesting Officer*   *Acting Commissioner of Patents and Trademarks*